3,202,691
PURIFICATION OF SULFONYL ESTERS
Alan John Maurice Wenham and Maurice Barrington Sparke, Sunbury-on-Thames, England, assignors to The British Petroleum Company Limited, London, England, a British joint-stock corporation
No Drawing. Filed Feb. 12, 1963, Ser. No. 257,838
Claims priority, application Great Britain, Mar. 14, 1962, 9,795/62
5 Claims. (Cl. 260—456)

This invention relates to a process for the purification of "Mesamoll." "Mesamoll" is defined herein as an ester having the general formula $$R_1SO_2O.R_2$$

where $R_1$ is a saturated open chain hydrocarbon radical and $R_2$ is an aromatic or aliphatic radical. Preferably $R_1$ is a $C_9$ to $C_{18}$ alkyl radical.

"Mesamoll" is formed by the reaction of a compound of the formula $R_2.OH$ (for example phenol) with a compound of the formula $$R_1SO_2Cl$$

The crude Mesamoll product will usually contain substantial quantities of the hydrocarbon $R_1H$ together with traces of coloured impurities, the presence of which is a disadvantage in utilising the Mesamoll particularly in the main application as a plasticiser.

In accordance with the present invention a crude Mesamoll product as hereinbefore described is treated for the removal, at least in part, of the coloured impurities by a process which comprises contacting the crude product with (a) aqueous alkali metal hydroxide and (b) an aliphatic alcohol having 3 or more carbon atoms per molecule, components (a) and (b) being added either together or separately in either order, and thereafter separating from the mixture an upper liquid layer.

According to the proportions of components (a) and (b), the residue, after separation of the upper layer, may consist of either one or two liquid layers. If desired, further quantities of Mesamoll may be recovered from the upper of these two layers.

Preferably aqueous sodium hydroxide is employed, suitably at a concentration of 2-N.

Preferably the aliphatic alcohol is isopropyl alcohol.

Suitably there is used 100 parts by volume of aqueous alkali metal hydroxide, e.g., 2 N aqueous sodium hydroxide with 20–40 parts by volume of the alcohol, e.g., isopropyl alcohol. These quantities are suitable for the treatment of 200 parts by volume of crude Mesamoll product.

Separation of phases after treatment as hereinbefore described may be achieved by the action of gravity or by centrifuging.

The Mesamoll containing top layer will contain substantial quantities of the hydrocarbon $R_1H$; this may be removed by steam stripping, preferably at reduced pressure.

This invention is illustrated by the following example:

Example

A solution of alkyl sulphonyl chloride (240 g., containing 0.5 mole of $RSO_2Cl$) in unchanged hydrocarbon, prepared by sulphochlorination of $C_{13}$–$C_{18}$ normal paraffins substantially free of other impurities was treated with phenol (0.55 mole) and excess anhydrous ammonia. After removal of precipitated ammonium chloride by filtration the crude Mesamoll solution was divided into two portions which were treated as follows:

(1) One portion was stripped with steam under reduced pressure. The colour of the resultant Mesamoll when measured in the two inch cell of a Lovibond tintometer was 2.7 yellow, 0.9 red.

(2) The second portion (125 g.) was washed with a mixture of caustic soda solution (25 ml., 2 N) and isopropyl alcohol (10 ml.). After separation of the phases the lower layer was rejected. This wash was repeated twice after which the remaining organic layer was washed to neutrality with water and finally stripped of unreacted oil with steam under reduced pressure. The colour of the resultant Mesamoll, measured as in (1) above was 1.1 yellow, 0.2 red.

We claim:
1. A process for the removal of coloured contaminants from a crude ester having the formula $R_1SO_2OR_2$, where $R_1$ is a $C_9$ to $C_{18}$ alkyl radical and $R_2$ is a phenyl radical, which comprises, treating the crude ester with an aqueous alkali metal hydroxide, and (b) isopropyl alcohol, and thereafter separating from the resulting mixture an upper liquid layer containing the decolourised ester.

2. A process according to claim 1 wherein the aqueous alkali metal hydroxide is sodium hydroxide of 2 N concentration.

3. A process according to claim 1 wherein 20–40 parts by volume of the alcohol are used per 100 parts by volume of the aqueous alkali metal hydroxide.

4. A process according to claim 1 wherein the removed upper layer containing the ester by steam stripped in such manner by any hydrocarbon $R_1H$ present is removed.

5. A process for the removal of coloured contaminants from a crude ester having the formula $R_1SO_2OR_2$, where $R_1$ is a $C_9$ to $C_{18}$ alkyl radical and $R_2$ is a phenyl radical, which comprises, treating the crude ester with (a) an aqueous solution of sodium hydroxide of 2 N concentration, and (b) isopropyl alcohol to thereby form a mixture having two layers, separating from said mixture the upper of said layers containing the said ester, and thereafter steam stripping said upper layer to remove hydrocarbons having the formula $R_1H$, where $R_1$ is a $C_9$ to $C_{18}$ alkyl radical, present in said upper layer with said ester.

References Cited by the Examiner
UNITED STATES PATENTS

| | | | |
|---|---|---|---|
| 2,046,507 | 7/36 | Freedman | 260—456 |
| 2,506,417 | 5/50 | Gilbert et al. | 260—456 XR |
| 2,660,588 | 11/53 | Gebhart et al. | 260—456 XR |

CHARLES B. PARKER, *Primary Examiner.*

UNITED STATES PATENT OFFICE
CERTIFICATE OF CORRECTION

Patent No. 3,202,691                                                August 24, 1965

Alan John Maurice Wenham et al.

It is hereby certified that error appears in the above numbered patent requiring correction and that the said Letters Patent should read as corrected below.

Column 2, line 38, for "by" read -- is --; line 39, for "by" read -- that --.

Signed and sealed this 29th day of March 1966.

(SEAL)
Attest:

ERNEST W. SWIDER                                        EDWARD J. BRENNER
Attesting Officer                                      Commissioner of Patents